United States Patent [19]
Jamzadeh et al.

[11] Patent Number: 6,130,928
[45] Date of Patent: Oct. 10, 2000

[54] ACCELERATION PROCESSING METHOD AND APPARATUS

[75] Inventors: Fereydoon Jamzadeh, Indianapolis; Joseph Henry Hunter, Carmel, both of Ind.

[73] Assignee: General Motors Corporation, Detroit, Mich.

[21] Appl. No.: 09/215,938

[22] Filed: Dec. 18, 1998

[51] Int. Cl.⁷ ...................................................... G01P 1/07
[52] U.S. Cl. ................................................. 377/23; 377/3
[58] Field of Search ............................................ 377/23, 3

[56] References Cited

U.S. PATENT DOCUMENTS

| | | | |
|---|---|---|---|
| 4,722,094 | 1/1988 | Goodzey | 377/23 |
| 5,123,035 | 6/1992 | Hottinger et al. | 377/23 |

FOREIGN PATENT DOCUMENTS

WO93/20427  10/1993  WIPO .

*Primary Examiner*—Margaret R. Wambach
*Attorney, Agent, or Firm*—Christopher DeVries

[57] ABSTRACT

A method of determining the acceleration of a rotating body by counting the number of teeth on a rotating gear member for one or more revolutions. The method minimizes the measurement lag using an overlapping method and calculating acceleration on each control loop that a new revolution count is available. The method determines the new tooth count based on the tooth count estimated for the next update. The old tooth count is discarded and the new tooth count is adjusted to match the old tooth count within the system constraints to provide less interrupts and faster acceleration updates. The number of gear revolutions to be counted are increased at higher gear speeds.

6 Claims, 10 Drawing Sheets

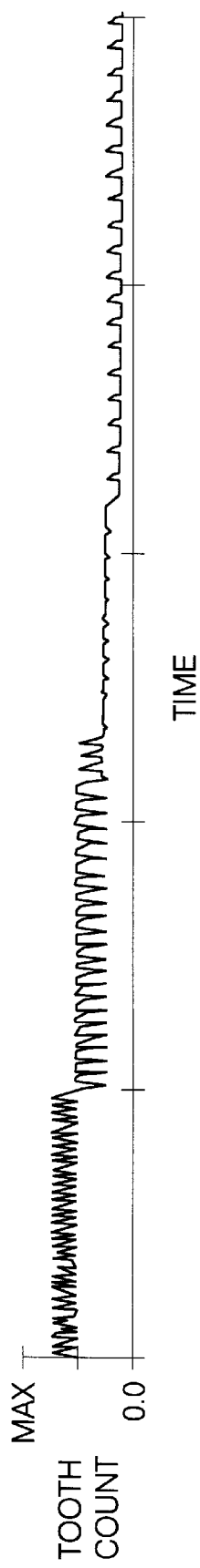
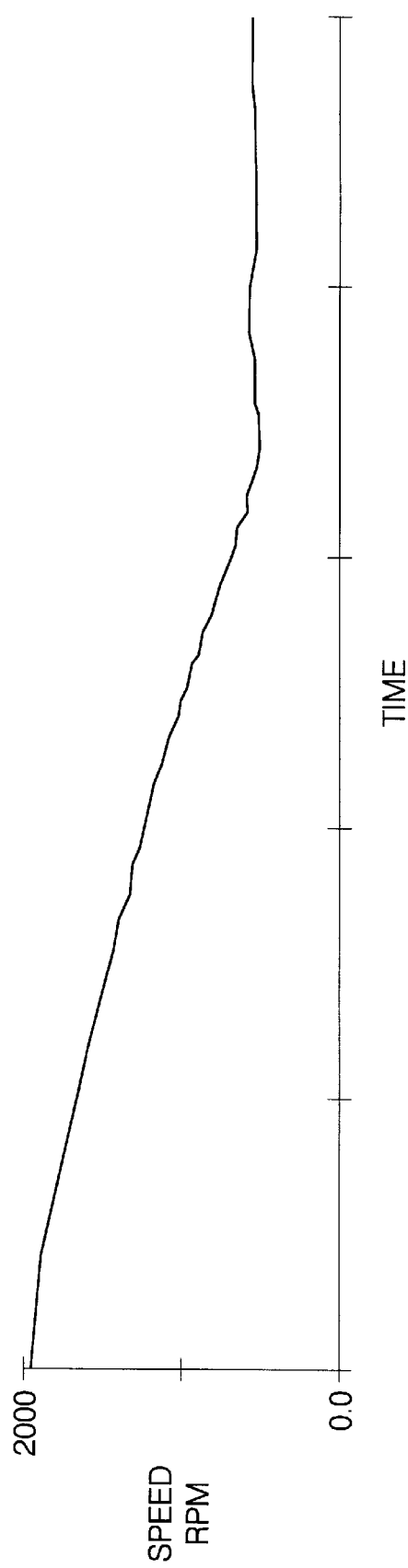
FIG. 6A
FIG. 6B

ACCELERATION PROCESSING METHOD AND APPARATUS

TECHNICAL FIELD

This invention relates to an apparatus for and a method of determining the acceleration of a rotating body and more particularly to an apparatus and method of determining the acceleration of a rotating body in a power transmission.

BACKGROUND OF THE INVENTION

Multi-speed power transmissions provide automatic ratio interchanges to accomplish efficient use of an internal combustion engine. The internal combustion engine has an operating speed range and torque range which limit its direct use in many vehicles. The multi-speed transmission extend the usefulness of the engine by reusing a portion to the engine output. The transmission provides many speed ratios such that high torque and low speed output range is available at vehicle launch and high speed lower torque output range is available for highway performance. The overall efficiency of the vehicle is improved by the proper interchange of transmission ratios while the vehicle speed is increased from launch to cruising.

Many signals are required to determine the proper shift sequence and other operating functions in the transmission. Engine throttle position, vehicle speed, engine speed and vehicle acceleration are some of the signals that are utilized. Of these signals, only vehicle acceleration is calculated from other available signals. The common method of determining acceleration is to measure the time it takes for a predetermined number of teeth on a rotating gear to pass and calculate the speed. Then, repeat the measurement for a new set of predetermined number of teeth and calculate a new speed. If the measured speeds differ, the component is accelerating and the value is calculated from the successive speeds.

SUMMARY OF THE INVENTION

It is an object of the present invention to provide an improved method of determining the acceleration of a rotating body.

In one aspect of the present invention, a method of calculating acceleration from a gear through a magnetic pickup and electronic hardware is provided. In another aspect of the present invention, the acceleration is calculated in software subroutines with the data collected from the magnetic pickup and supplied through the electronic hardware.

In yet another aspect of the present invention, tooth to tooth variations in the gear are eliminated. In still another aspect of the present invention, the eccentricity effects of the gear are eliminated.

In yet still another aspect of the present invention, the number of teeth to be counted to achieve total tooth counts equal to one or more revolutions is adjusted during operation. In a further aspect of the present invention, time measurement lag is minimized by calculating the acceleration on each control loop that a new revolution count becomes available.

In a yet further aspect of the present invention, a new tooth count based on a tooth count estimate for the next update is determined. In a still further aspect of the present invention, the number of revolutions to count is increased at higher speeds.

DESCRIPTION OF AN EXEMPLARY EMBODIMENT

Figure 1:
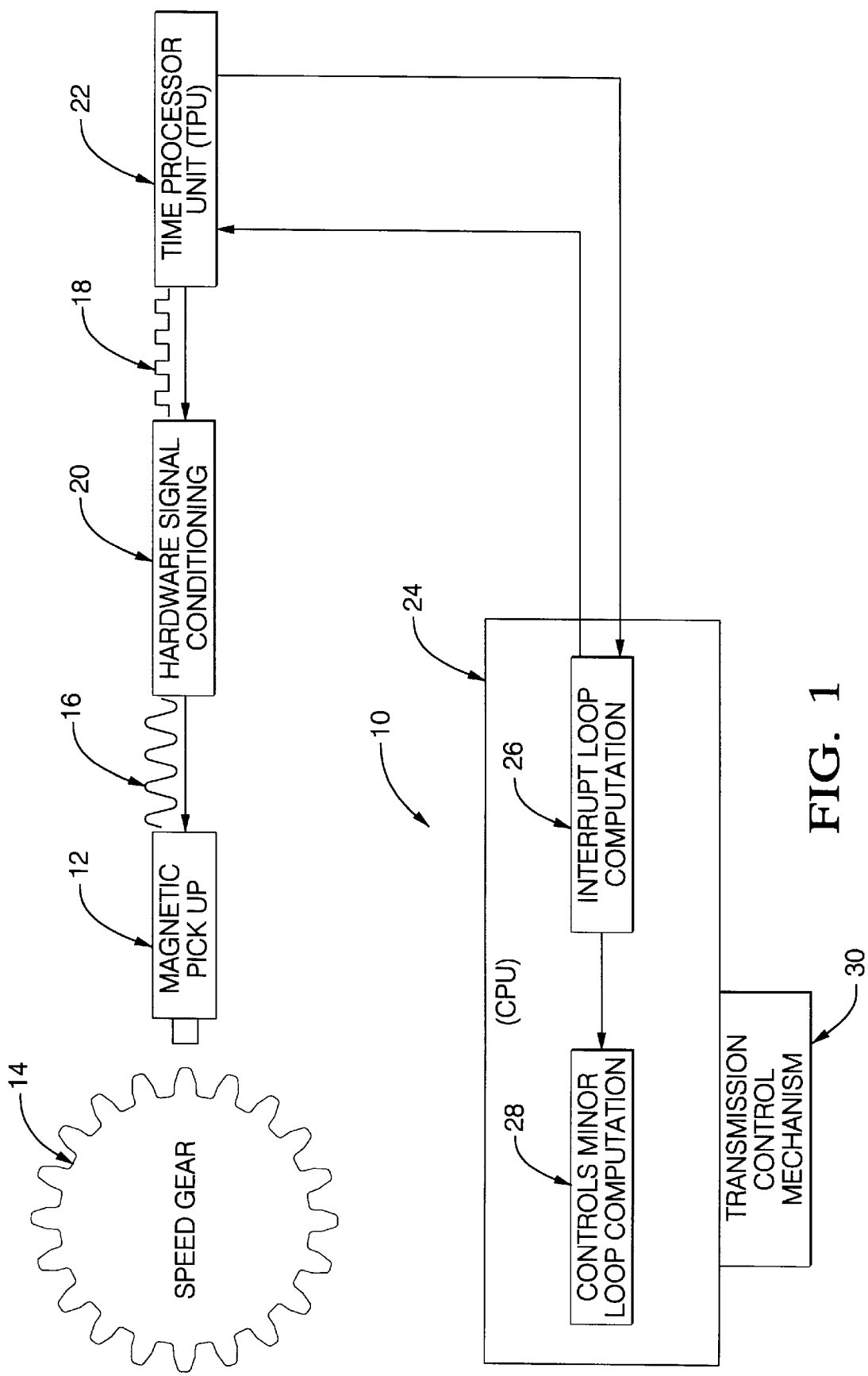
FIG. 1 is a diagrammatic view of a portion of a control system incorporating the present invention.

Referring to FIG. 1, there is seen a diagrammatic representation of a control system 10 which measures rotational speed and processes the data to provide the desired control data. The rotational speed is sensed by a magnetic pickup 12 operating in conjunction with a toothed gear 14. The magnetic pickup 12 is a conventional device which works off of the principle that the change in the net amount of flux generated by a changing magnetic field will generate an alternating current signal in the pickup coil. As the gear 14 rotates, the passing of each tooth causes the change in flux to generate an alternating current signal 16. This alternating signal 16 is then converted into a square wave 18 using a signal conditioning circuit 20. In a Time Processing Unit (TPU) 22, the generated square wave 18 is converted to counts by counting the falling or rising edges of square wave. Each count is the representative of each tooth passed.

A Central Processing Unit (CPU) 24 commands the TPU 22 how many teeth it would like to be counted. The TPU 22 in return generates a hardware interrupt when it has completed the specified tooth count. When this interrupt occurs, the value of a conventional continuous timer, not shown, is read into a conventional register. This is done to insure that an accurate time is preserved for the calculation of speed based on number of teeth counted.

The continuous timer mentioned above, is an internal time whose value increments by one upon each clock cycle. For a 16 bit system, it continues to increment up to a maximum double byte value of 65535, after which it resets to zero. This resetting to zero is called a timer overflow and also causes an interrupt within the CPU 24 to signal its occurrence. Assuming the CPU 24 clock frequency of 2 MHz, this timer has a period of 32.768 ms.

The first task of the CPU 24 is to subtract the current timer value latched in a register by interrupt from the timer value which corresponds to the previous interrupt which was stored in memory. This will result in the time interval, in CPU clock cycles, that it took to count the commanded number of teeth.

The next function of the CPU 24 is to determine if it should command a change in the number of teeth that TPU is counting. It does this by using the time interval. It compares this interval to a window of 22000 to 45000 clock cycles, which corresponds to 11 to 22.5 ms. If the interval falls within this desired window, then the commanded number of teeth to count (1,2,4,8,16,etc) does not usually change unless it is determined that different number of teeth count is required to achieve revolution counts. If, however, the interval is greater than 45000, then the CPU 24 commands to halve the number of teeth it is to count (limited to a minimum of one). Similarly, if the interval is less than 22000, then CPU 24 commands to double the number of teeth to count. The purpose of this adjustment in the number of teeth being counted is to keep the interrupts within a reasonable interval—fast enough so that CPU 24 has some recent data for better speed processing, and slow enough that the CPU 24 is not overburdened by interrupts.

Within the CPU 24, an interrupt loop calculation 26 is triggered after the TPU 22 has completed an specified tooth count and generated a speed processing interrupt. The interrupt loop calculation is a set of software subroutines, including those described in FIGS. 3 and 4A that calculate the number of teeth to count next time. Also within the CPU 24, another interrupt structure triggers a minor loop 28 every 16.384 ms. The minor loop 28 is a set of software subroutines, including those described in FIG. 5, that calculate the speed and calculation signals, apply the filters for these signals, perform shift scheduling, clutch control, and diagnostics, send pressure commands to the solenoids, and many other functions of a conventional transmission control mechanism 30. Speed processing interrupts and the minor loop 28 interrupt structure have no timing relationship and operate asynchronously. Therefore, it is possible to get zero, one, or two speed interrupts through a minor loop 28.

The cyclical effects inherent in gear systems can be completely resolved when the measurements are done over cycles. If the gear teeth are counted over one or more hardware interrupts that always equal one or more gear revolutions, the acceleration calculation is free of cyclical effects. The phase lag associated with revolution counts is also minimized by overlapping the revolutions (FIG. 2) and using the following equation to calculate acceleration:

$$\text{Acceleration} = (V2 - V1)/X$$

Where: V1 is the speed calculated over the old revolution, V2 is the speed calculated over the new revolution, and $$X = 1/2 \, (\text{Old\_Clock\_Cycles} + \text{New\_Clock\_Cycles})$$

Where: Old_Clock_Cycles is the clock cycle from old revolution that are discarded, and New_Clock_Cycles is the clock cycles that are counted recently to generate the new revolution.

It should be noted that New_Clock_Cycles may or may not be equal to Old_Clock_Cylces.

Figure 3:
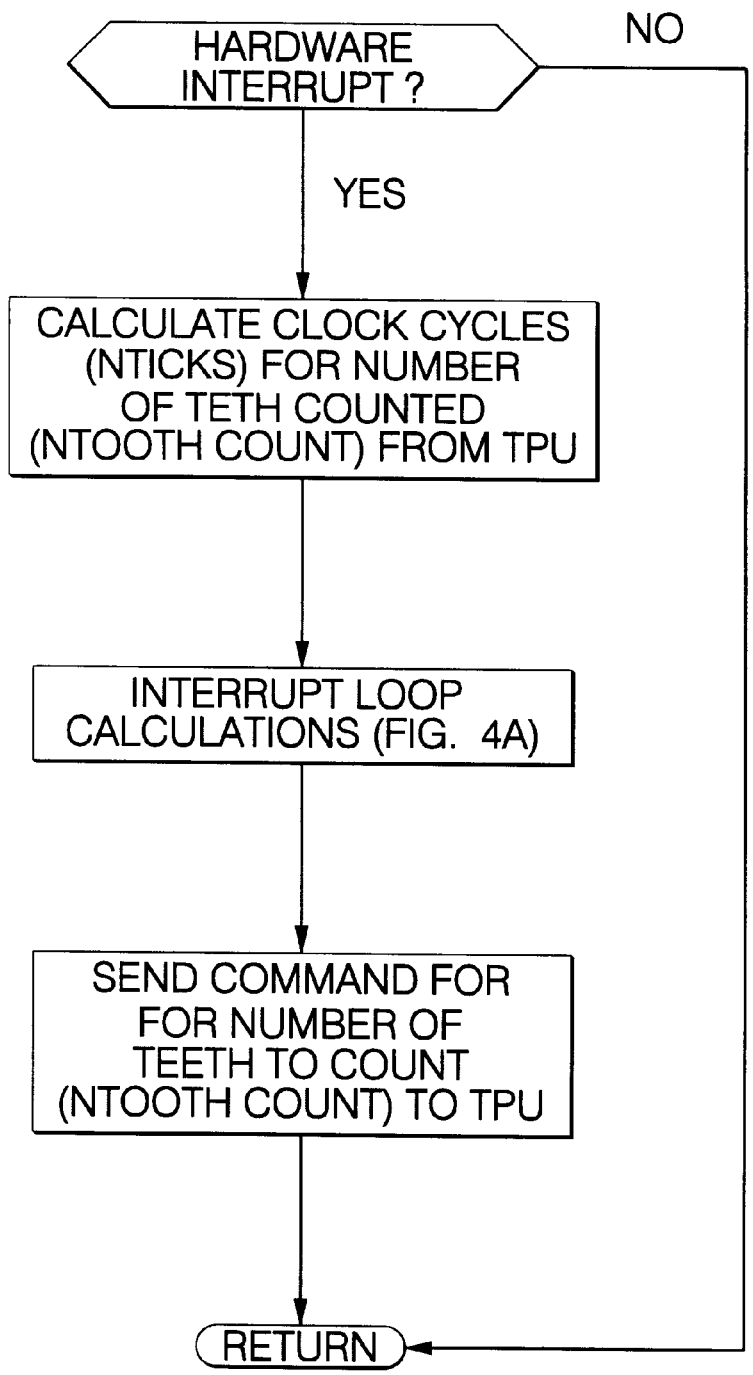
FIG. 3 is a software routine used in performing the present invention.

Referring to FIG. 1 and 3, when the TPU 22 generates a hardware interrupt, the value of a continuous timer is read into register. Then, the CPU 24 subtracts the current timer value latched in the register by interrupt from the timer value which corresponds to the previous interrupt which was stored in memory. This will result in the time interval, in CPU 24 clock cycles that it took to count the commanded number of teeth. In this invention, nticks and ntooth_count are the variables name used to describe clock cycles and counted number of teeth respectively. Referring to FIG. 3, when nticks and ntooth_count are obtained, a set of computations are made (FIG. 4) to determine the number of teeth to count next time.

Figure 4A:
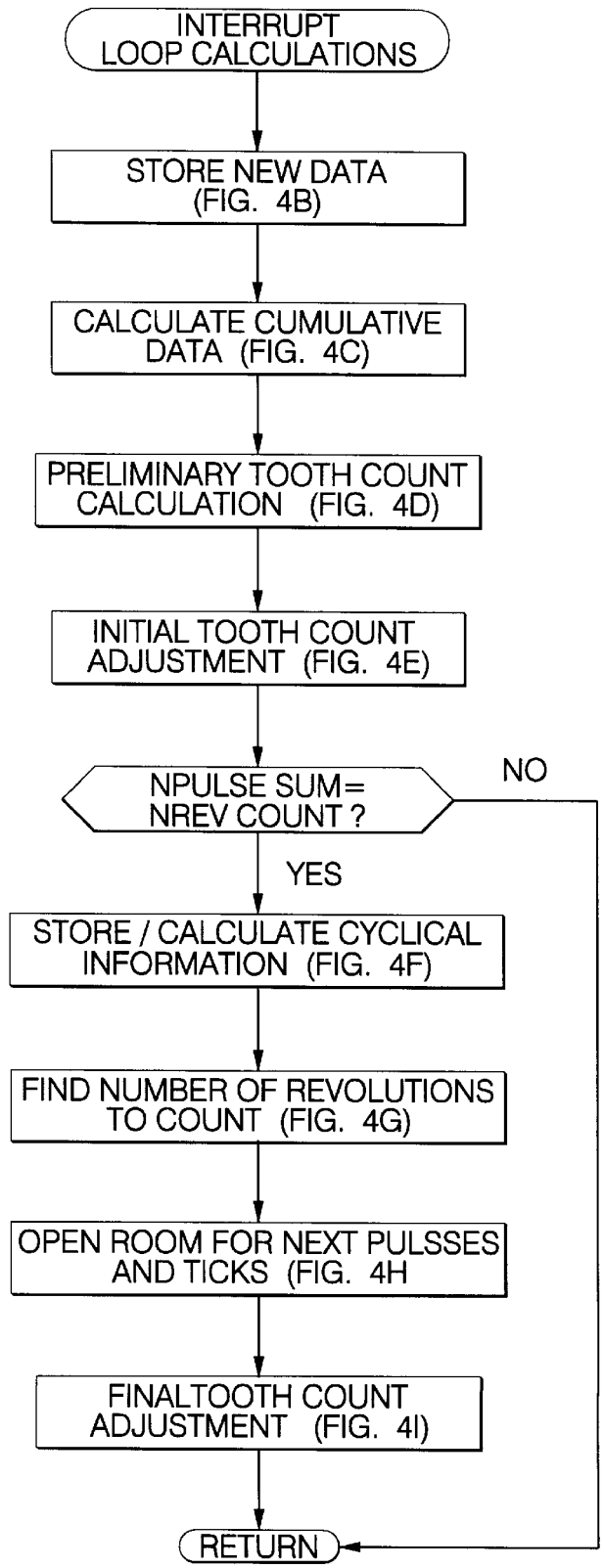
FIG. 4A is a sub-routine under the routine in FIG. 3.
Figure 4:
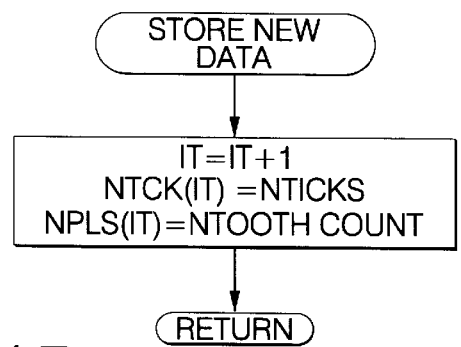
FIGS. 4B, 4C, 4D, 4E, 4F, 4G 4H and 4I are sub-routines use in the sub-routine of FIG. 4A.
Figure 4:
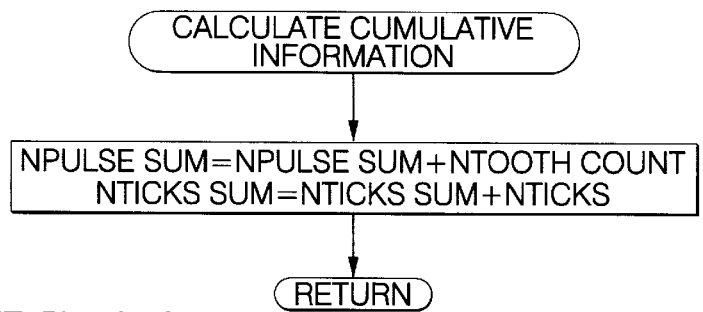
Figure 4:
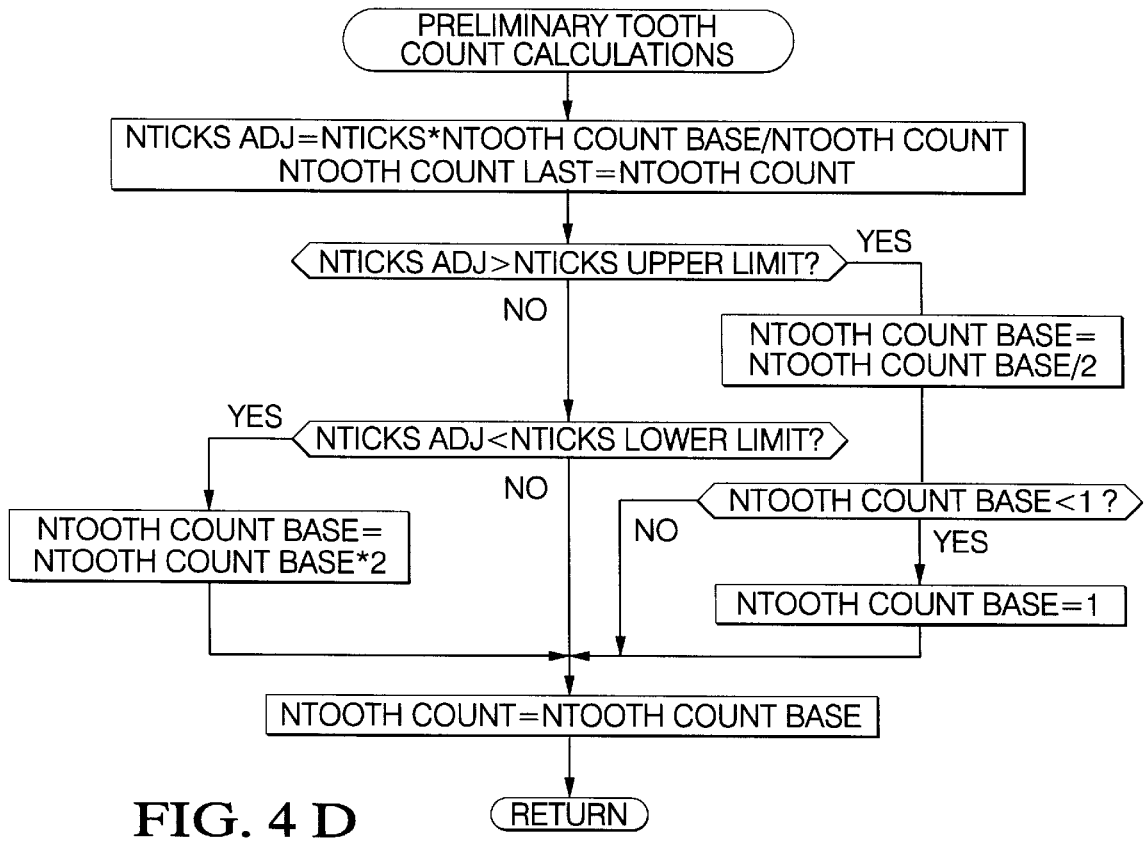
Figure 4:
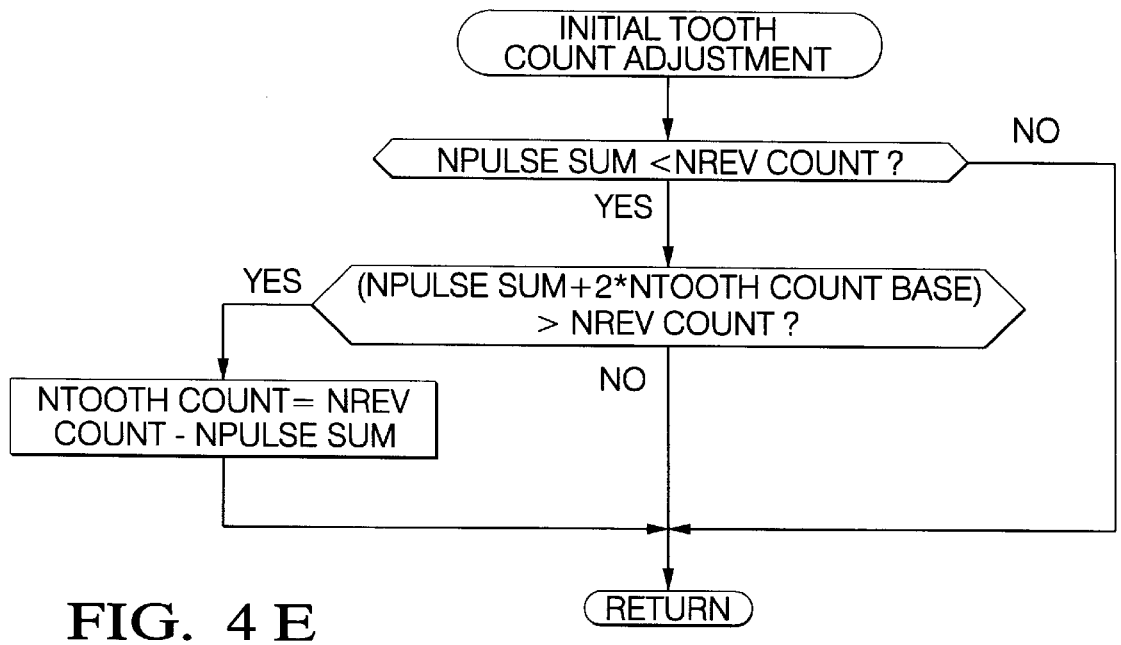
Figure 4:
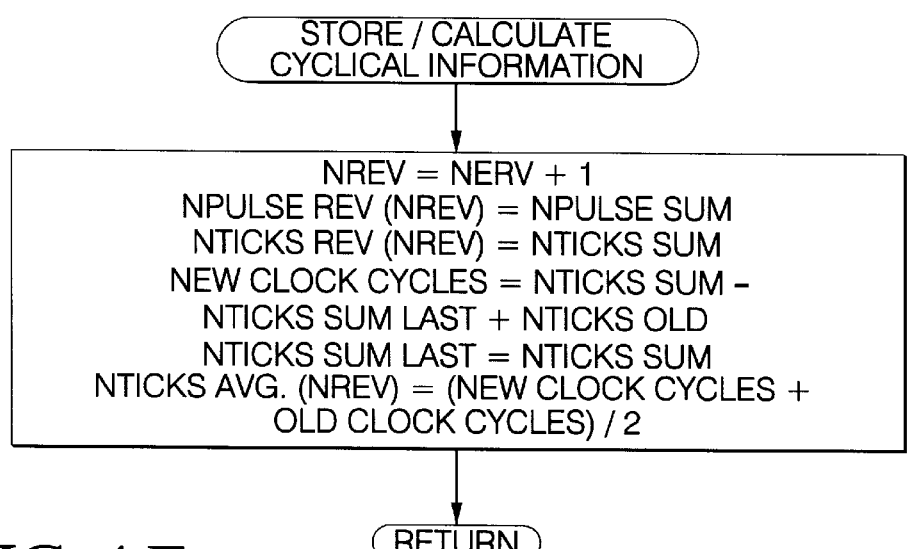
Figure 4:
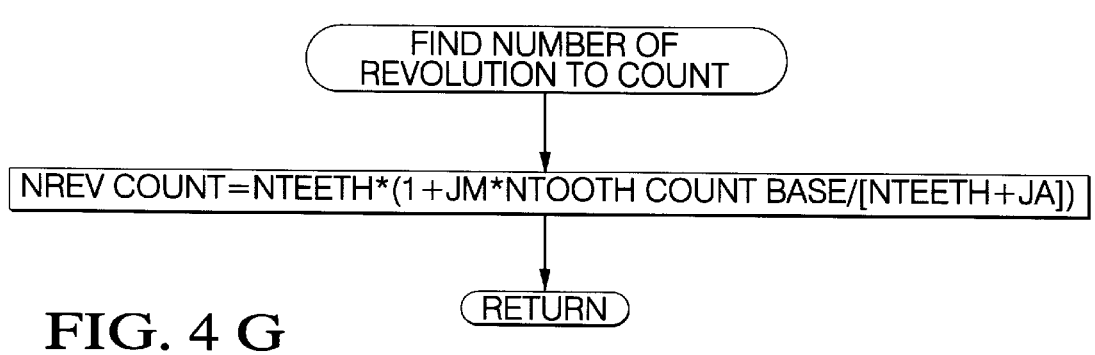
Figure 4:
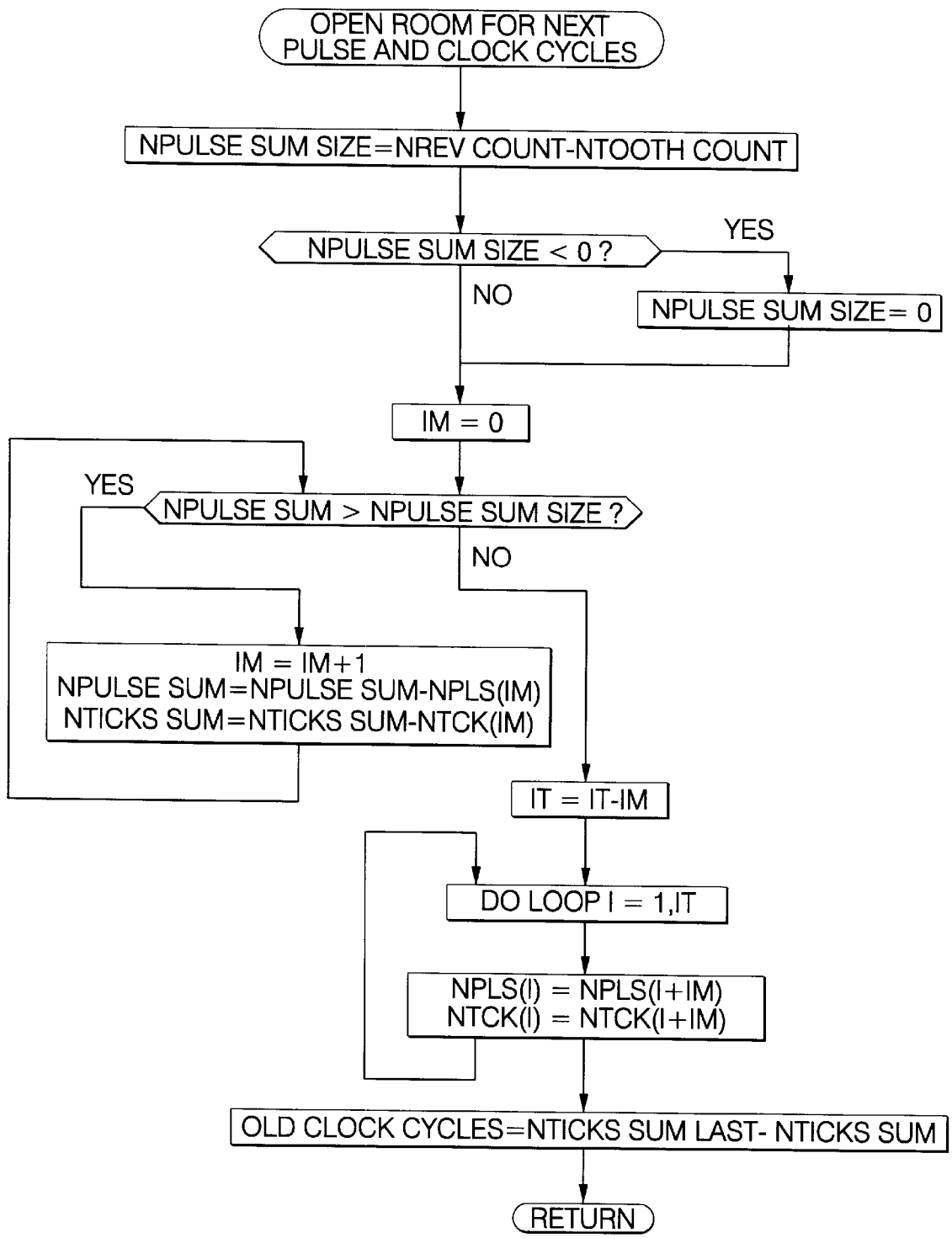
Figure 4:
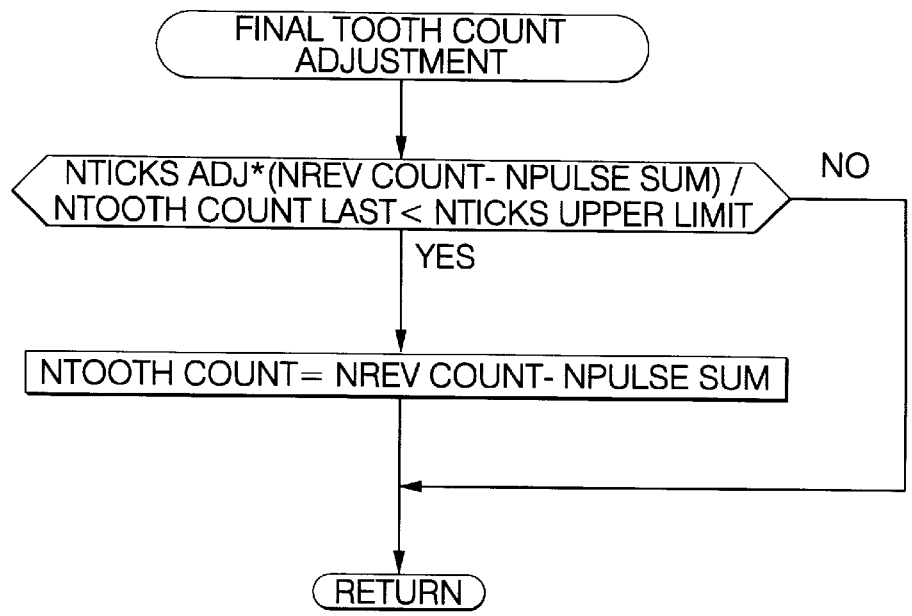

FIG. 4A shows the top level diagram for computations made in the interrupt loop. First, the new data are stored in a set of array (FIG. 4B). Then, the cumulative data based on the new information are computed (FIG. 4C). A preliminary number of teeth to count for the next time are computed using the current speed processing method (FIG. 4D). For this invention, no attempt was made to optimize the base method of tooth count change. The number of teeth to be counted are then adjusted to assure the cumulative data in future updates equal one or more gear revolutions (FIG. 4E). At this point, if the number of teeth stored is less than one or more gear revolutions, the number of teeth to count is commanded to the TPU 22.

However, if the number of the teeth stored is equal to one or more gear revolutions, more computations are required to store the data for the minor loop cyclical speed and acceleration computations and prepare the processing system for future cyclical information. First, a new set of data based on cyclical information is stored (FIG. 4F). At this point, the new clock cycles and the average of old and new clock cycles are determined. Next, the commanded tooth count is checked against number of the teeth per gear to see how many gear revolutions needs to be counted for the next update (FIG. 4G). The next step is to eliminate some of the old data to open space for new information and determine the old clock cycles that are discarded (FIG. 4H). If warranted, a final attempt is made to minimize the number of future interrupts by adjusting the number of teeth to be counted (FIG. 4I).

Figure 5:
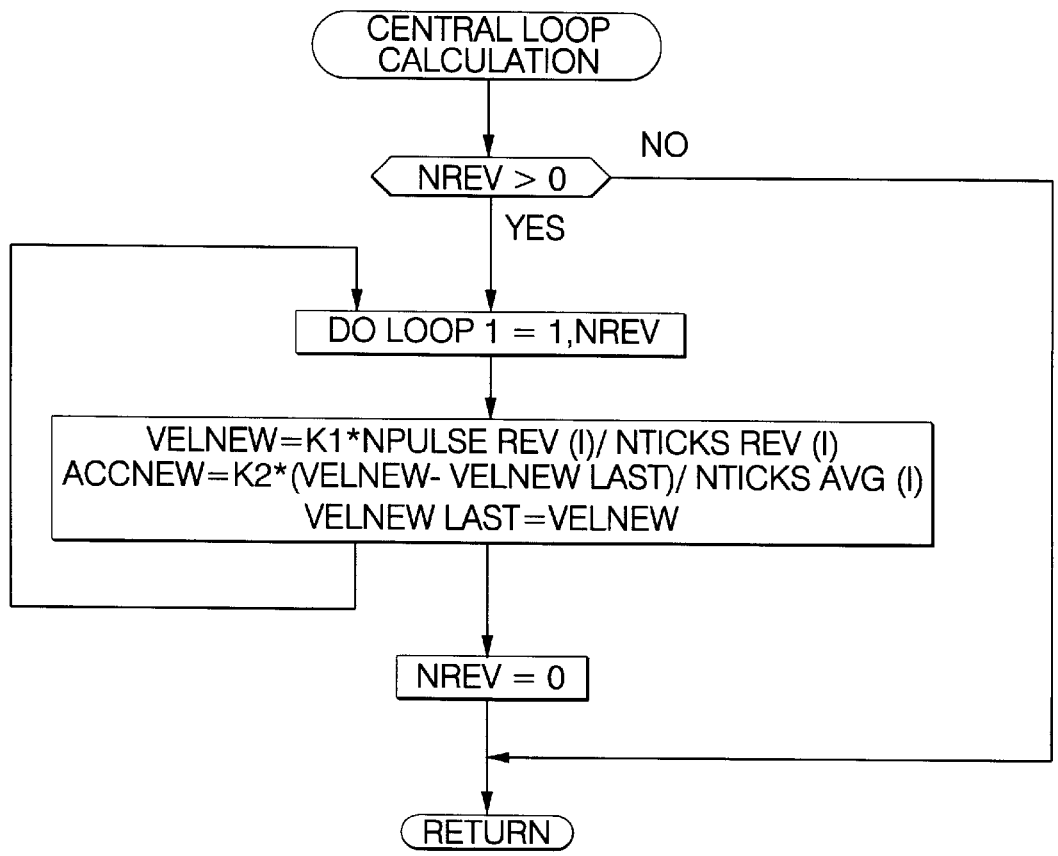
FIG. 5 is a sub-routine for calculating the acceleration based on the routine in FIG. 3 with the data as collected as shown in FIG. 2.

Speed processing interrupts and the minor loop interrupt have no timing relationship and operate asynchronously. Therefore, it is possible to get multiples set of cyclical information per minor loop. During a minor loop, if there is any cyclical information available, then a new speed and acceleration are calculated as shown in FIG. 5.

In FIG. 4B, the new clock cycles (nticks) and number of teeth counted (ntooth_count) are stored for future use.

In FIG. 4C, new ticks (nticks) and tooth counts (ntooth_count) are added to accumulative variables nticks_sum and npulse_sum respectively. Nticks_sum and npulse_sum are used to calculate a new speed and acceleration when npulse_sum equal one or more gear revolutions.

A preliminary tooth count is calculated in FIG. 4D. Since it is possible to have a different number of teeth counted (ntooth_count) from the preliminary tooth count calculation (ntooth_count_base) due to further adjustment, an adjusted clock cycle is calculated (nticks_adj). Nticks_adj provides the number of clock cycles as if ntooth_count_base was the number of teeth to count.

Nticks_adj is used to command a change in the number of teeth to count. It compares this interval to a window of clock cycles (nticks_lower_limit to nticks_upper_limit). If the interval falls within this desired window, then the commanded number of teeth to count does not change. If, however, the interval is greater than nticks_upper_limit, then the CPU 24 commands to half the number of teeth it is to count. Similarly, if the interval is less than nticks_lower_limit, then CPU 24 commands to double the number of teeth to count. The purpose of this adjustment in the number of teeth being counted is to keep the interrupts within a reasonable interval—fast enough so that CPU 24 has some recent data for better speed processing and slow enough that the CPU 24 is not overburdened by interrupts. It should be noted that the method mentioned here is one of several different methods that can be used to adjust the number of teeth to be counted. This method can be replaced with any other similar method as long as the system constraints (minimum interrupts and most recent data) are met.

An initial tooth count adjustment is provided by the sub-routine of FIG. 4E. When the pulse summation (npulse_sum) is less than a revolution, it is important to adjust the tooth count for next time when appropriate. The tooth count adjustment is made when the term "npulse_sum+2*ntooth_count_base" is greater than one or more revolutions. The term "2*ntooth_count_base" represent the maximum possible tooth count for the next update according to the method employed in preliminary tooth count adjustment.

In FIG. 4F, the information is stored and calculated. Referring back to FIG. 4A, if the number of the pulses collected (npulse_sum) is now equal to one or more revolutions, the results must be stored for speed and acceleration calculation in the control minor loop. The new clock cycles (New_clock_cycles), based on the current clock cycle summation (nticks_sum), previous clock cycles summation (nticks_sum_last), and discarded clock cycles (Old_clock_cycles) is calculated. Old_clock_cycles is determined as a part of the subroutine in FIG. 4H. An average (nticks_avg) of new clock cycles and old cycles are also determined at this point and will be used to calculate acceleration.

The sub-routine in FIG. 4G will determine the number of revolutions to count. As speed increases, the preliminary tooth count (ntooth_count_base) is set higher (i.e., 1,2,4, 8,16,32,64, . . . ). At higher speed, ntooth_count_base is eventually set above the number of teeth per gear(nteeth) through the preliminary tooth count calculation. As a result more than one revolution is counted to eliminate the cyclical effects. Fixed point math is used to calculate the number of revolutions (nrev_count) in integer (1,2,3,etc.).

In FIG. 4H, space is made available for new information. After a signal collection equivalent to one or more revolutions, some of the old clock cycles are discarded to keep space open for new information. First, the number of teeth to be kept is determined for the next revolution (npulse_sum_size) by opening room equal to the estimated commanded tooth count (ntooth_count). Then, the old pulses and clock cycles are eliminated. It should be noted that following this process, the remaining pulses (npulse_sum) may not be equal to the desired pulses (npulse_sum_size) and is completely random. After the old information is eliminated, the old cycles are restaked and the discarded clock cycles(Old_clock_cycles) are determined. This information will be used in FIG. 4F to calculate an average of old and new clock cycles.

A final tooth count adjustment is made in the sub-routine shown in FIG. 4I. Since the opened room for new tooth count (nrev_count−npulse_sum) is not necessarily the same as the desired commanded tooth count (ntooth_count), a final attempt is made to adjust the commanded tooth count in order to minimize the number of interrupts and still maintain the most recent data. This is done by estimating the number of clock cycles generated in counting "(nrev_count−npulse_sum)" teeth. If the estimated clock cycles is less than the nticks_upper_limit, then the number of teeth to count can be increased by setting ntooth_count= nrev_count−npulse_sum.

Figure 2A:
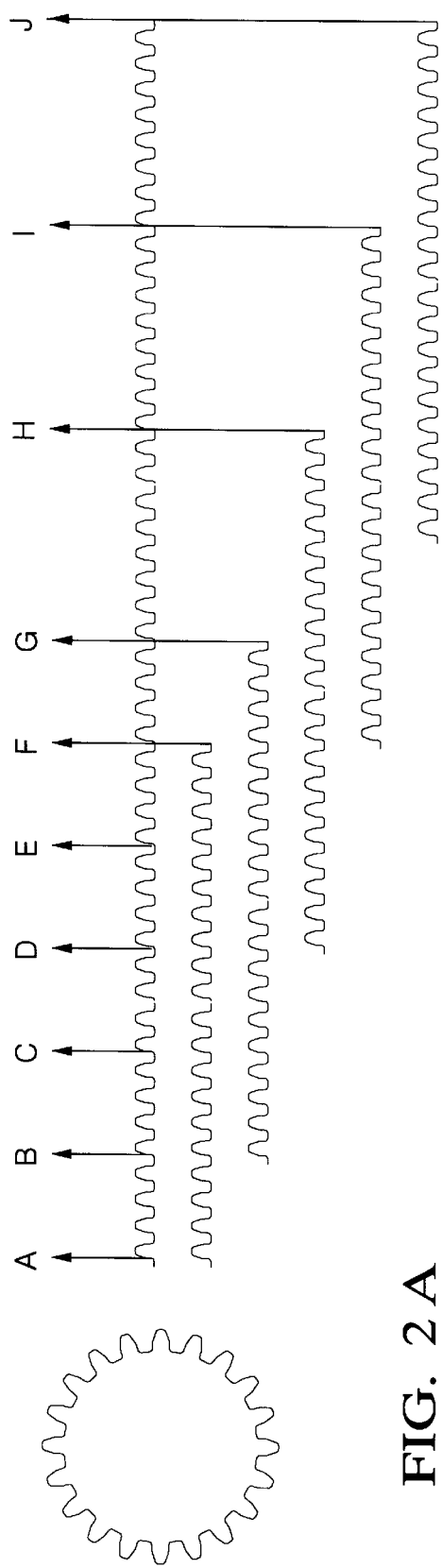
FIG. 2A and 2B are schematic representations of tooth count based on overlapping revolutions.
Figure 2B:
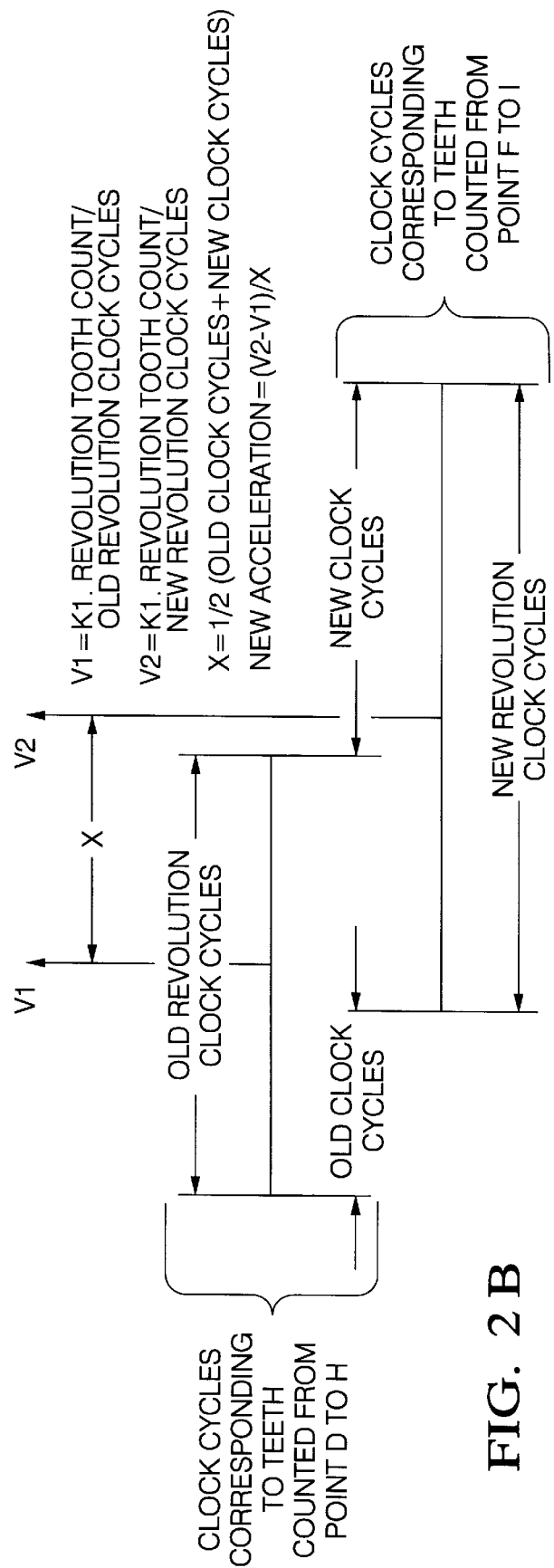

A control loop calculation is made based on one, or two set of cyclical results (nrev) per minor loop as shown in FIG. 5. The new speed is calculated similar to prior uses with the exception of using the clock cycle and tooth counts based on revolutions rather than interrupts. The new acceleration is calculated based on average of old and new clock cycles as shown in FIG. 2 and described above. K1 and K2 are calibration constants for this calculation. The CPU is informed of the acceleration so that proper control signals can be issued to a transmission control mechanism

| Name | Description | Type | Range |
|---|---|---|---|
| Nteeth | Number of teeth per speed gear | const. | 1–255 |
| ntooth_count | Number of teeth to count before issuing an interrupt | var. | 1–255 |
| It | counter for storing the information per interrupt | var. | 0–100 |
| ntck(i) | An array to store ticks (number of clock cycles per interrupt) | | |
| npls(i) | An array to store pulses (number of teeth counted per interrupt) | | |
| nticks_sum | Clock cycles summation | var. | 1–2**24 |
| npulse_sum | Tooth Pulse summation | var. | 1–255 |
| nrev_count | Number of tooth to count to match gear revolution(s) | var. | 1–255 |
| nticks_rev(i) | An array to store clock cycles per revolution (s) | | |
| npulse_rev(i) | An array to store tooth pulses per revolution(s) | | |
| new_clock_cycles | Number of new clock cycles since last revolution count | var. | 1–2**24 |
| nticks_sum_last | clock cycles summation, last update | var. | 1–2**24 |
| nticks_avg(i) | An array to store average of new and old clock cycles | | |
| old_clock_cycles | Number of clock cycles that are discarded from last revolution count | var. | 1–2**24 |
| nticks_adj | adjusted number of clock cycles as if number of tooth counted last time were ntooth_count_base | var. | 1–2**24 |
| ntooth_count_last | Previous number of tooth counted | var. | 1–255 |
| ntooth_count_base | Preliminary number of tooth to count next time (before adjustment) | var. | 1–255 |
| nticks_upper_limit | Maximum desired number of clock cycles to count per interrupt | Const | 1–2**16 |
| nticks_lower_limit | Minimum desired number of clock cycles to count per interrupt | Const | 1–2**16 |
| npulse_sum_size | Desired number of tooth count to hold for next revolution calculation | var. | 1–255 |
| Im | counter, used to adjust the clock cycles and pulse sum | var. | 1–255 |
| k1 | A constant which is the function of clock frequency and number of gear teeth | const. | |
| k2 | A constant which is the function of clock frequency | const. | |
| Velnew | New Speed | var. | 0–10000 |
| Accnew | New Acceleration | var. | +/−10000 |
| velnew_last | Previous value of the new speed | var. | 0–10000 |
| Nrev | stored number of revolution data per control loop | var. | 0–5 |
| Jm | A constant which determine number of revolution | const. | 1–20 |

-continued

| Name | Description | Type | Range |
|------|-------------|------|-------|
| | to count | | |
| Ja | A constant to determine when to change the "number of revolution to count" | const. | 0 or 1 |

Figure 6:
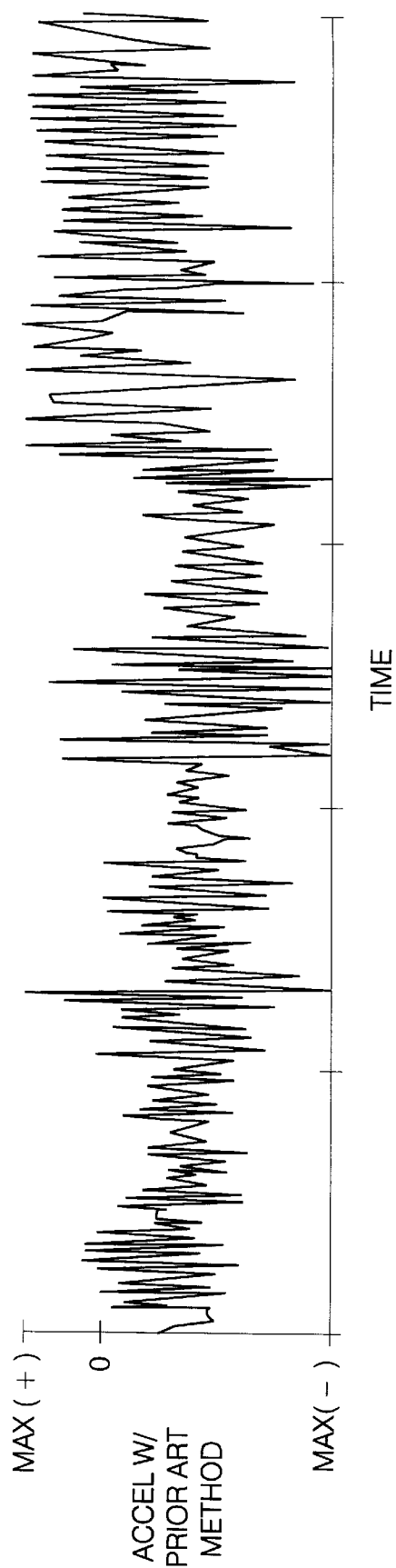
FIG. 6 is a set of curves describing tooth count, vehicle speed, acceleration as measured by the prior art and acceleration as measured by the present invention.
Figure 6:
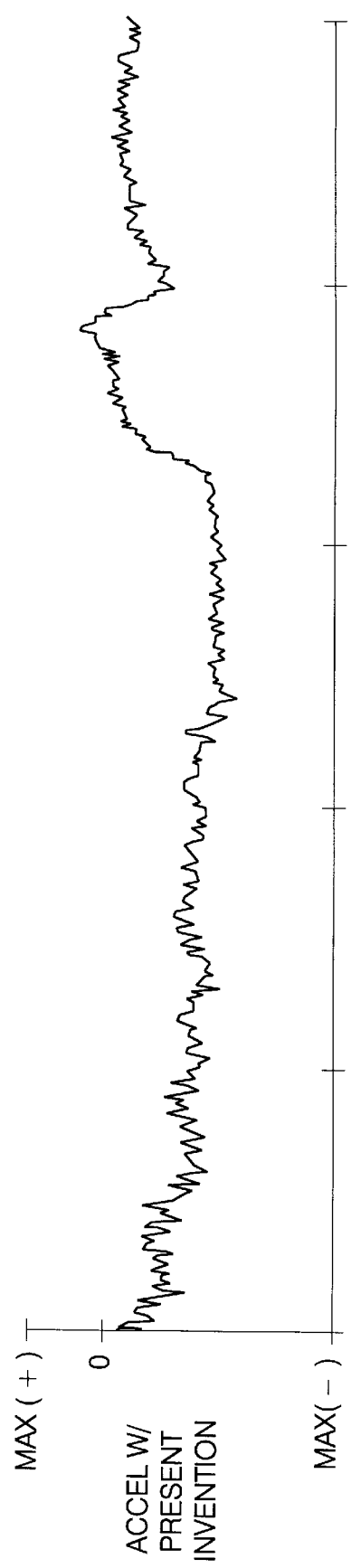

The curves shown in FIG. 6 describe (curve A) the tooth count change during an acceleration calculation (curve D) during a decreasing speed (curve B). This is compared to an acceleration as calculated by a prior art method (curve C). From these curves and the above description, the advantages of this method will be apparent to those skilled in the art.

However, it is considered appropriate to set forth some of the more prominent advantages.

It eliminates cyclical errors.

It does not include complex calculations and can be used in a variety of applications especially powertrain controls.

It is independent of the number of teeth on the gear; and can therefore be applied to existing systems without any change in the hardware. (a software change of nteeth and k1 to apply to a new gear with a different number of teeth)

The number of hardware interrupts due to speed processing system stays almost the same. (Achieved by Final Tooth Count Adjustment, FIG. 4I)

There is no maximum speed limitation.

What is claimed is:

1. A method of processing acceleration of a rotating toothed element having a predetermined number of teeth comprising:
   determining a first number of teeth to count;
   counting the first number of teeth as a first tooth count;
   storing the first tooth count and a first number of clock cycles representing a first time period determined from counting the first tooth count;
   accumulating the first tooth count and the first number of clock cycles until at least a first revolution has been completed;
   determining a number of teeth to discard to establish a second tooth count;
   discarding a portion of the first tooth count equal to the second tooth count;
   counting the second tooth count and a second number of clock cycles representing a second time period determined from counting the second tooth count to establish a second revolution;
   accumulating the second tooth count and the second number of clock cycles minus the discarded portion of the first tooth count and the first number of clock cycles to determine at least a second revolution;
   calculating velocity for the first revolution and for the second revolution;
   comparing the velocities of the first and second revolutions to determine an acceleration of the rotating toothed element;
   determining if the first time period falls within a time period range; and
   changing the number of teeth to count if the first time period does not fall within the time period range.

2. An apparatus for determining an acceleration of a toothed rotating body comprising:
   means for providing an impulse for each tooth on the toothed rotating body;
   means for processing the impulses in a timed fashion;
   means for determining a first time and a first tooth count for a first number of revolutions of the rotating body and storing the first time and the first tooth count, and for determining a second time and a second tooth count for a second number of revolutions of the rotating body and storing the second time and the second tooth count;
   means for determining an acceleration of the rotating body from a comparison of the first and second times, the first number of revolutions and second number of revolutions and issuing a signal based on the acceleration to a control mechanism;
   means for determining if at least one of the first and the second times fall within a time period range; and
   means for varying at least one of the first tooth count or the second tooth count if the first time or the second time do not fall within the time period range.

3. A method of processing acceleration of a rotating toothed element having a predetermined number of teeth comprising:
   determining a number of teeth to count;
   counting the number of teeth as a tooth count;
   storing the tooth count and a first number of clock cycles representing a first time period needed to count the tooth count;
   storing the tooth count and a second number of clock cycles representing a second time period needed to count the tooth count;
   calculating a first velocity of the rotating toothed element for the tooth count and first number of clock cycles;
   calculating a second velocity of the rotating toothed element for the tooth count and the second number of clock cycles;
   calculating acceleration of the rotating toothed element using the first and second velocities;
   determining if the first time period falls within a time period range;
   determining if the second time period falls within the time period range; and
   changing the number of teeth to count if at least one of the first time period or second time period does not fall within the time period range.

4. The method of claim 3 further comprising the step of varying the number of teeth to count during the second time period.

5. The method of claim 3 further comprising the step of varying the number of teeth to count to adjust at least one of the first time period or the second time period to fall within the time period range.

6. The method of claim 3 further comprising the step of:
   shifting an automatic transmission in a vehicle in response to the determined acceleration of the rotating toothed element.

* * * * *